Patented June 12, 1934

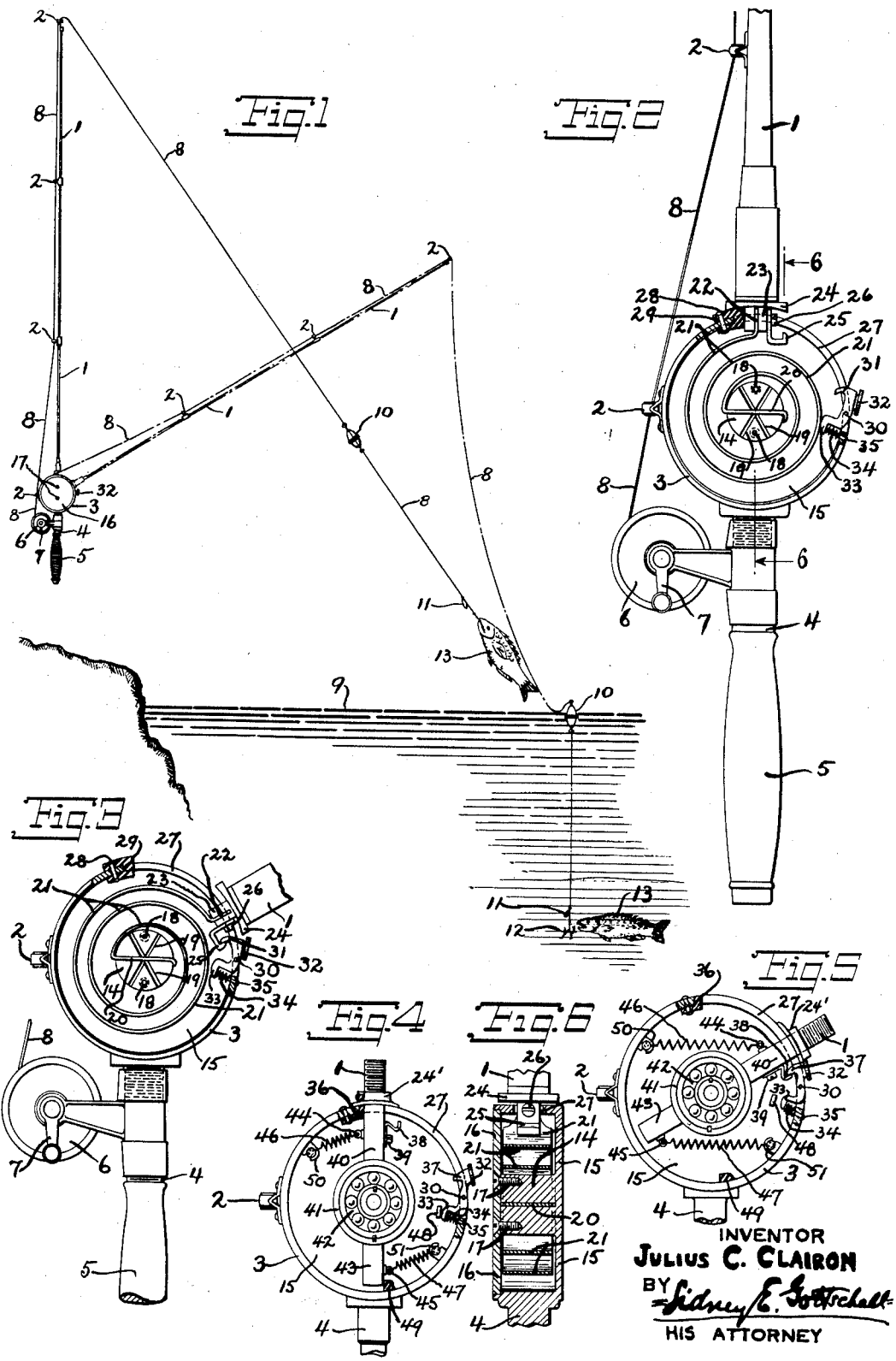

1,962,232

UNITED STATES PATENT OFFICE 1,962,232

FISHING DEVICE

Julius C. Clairon, Brooklyn, N. Y., assignor to Emily Clairon, Brooklyn, N. Y.

Application June 5, 1933, Serial No. 674,279

19 Claims. (Cl. 43—15)

This invention relates to novel fishing devices and, more particularly, to improvements in automatic means for actuating fishing poles and the like.

One of the objects of this invention is the creation of a fishing device adapted to automatic actuation in response to the bite and/or pull of a fish on a hook and line.

Another object of this invention is the creation of a fishing device adapted to automatically firmly embed a fish hook in a fish's mouth or jaw when actuated by the bite and/or pull of the fish on the hook and line.

Another object of this invention is the creation of a fishing device adapted to automatically pull a fish from the water when actuated by the fish's bite and/or pull; and A still further object of this invention is the creation of a fishing device adapted to automatically pull a fish out of water upon actuation thereof and which is of simple, rugged and cheap construction, quickly attachable to and detachable from a standard fishing pole, as well as quickly assembled and disassembled for cleaning, replacement of parts as well as for readjustment for the various sizes and types of fish which one seeks to catch.

Various other objects and advantages of the invention than those hereinabove mentioned will appear more fully hereinafter. It is to be understood, that the specific forms shown are merely illustrative and hence the detailed description thereof is not to be taken as limiting the invention itself.

The invention resides substantially in the parts, as well as in the combination, construction, location and relative arrangement of parts, all as will be more fully pointed out hereinafter.

Referring to the drawing, wherein like numerals refer to similar parts throughout the several views, it will be found that:

Fig. 1 is a side elevational view of a fishing pole constructed in accordance with and embodying my invention, the fishing pole being shown in its sprung or operated position by full lines and in its set or operative position by dot and dash lines;

Fig. 2 is an enlarged side elevational view of the lower portion of the fishing pole shown in Fig. 1 in sprung or operated position with the cover of the actuating device removed;

Fig. 3 is a view similar to that of Fig. 2 but showing the actuating device in set or operative position;

Fig. 4 is a side elevational view of a possible modified embodiment of actuating device in sprung or operated position;

Fig. 5 is a side elevational view of the embodiment shown in Fig. 4 in set or operative position; and Fig. 6 is a sectional view taken along the section line 6—6 in Fig. 2 looking in the direction of the arrows.

It is the purpose of this invention to render fishing more certain. The contemplated means for accomplishing this is of an automatic nature arranged to be actuated by and in response to the bite and/or pull of a fish. When so actuated such means will automatically act to firmly embed the fish hook being used in the fish's mouth or jaw and/or pull the fish out of water.

Referring now to the drawing, in detail, it will be noted that in Fig. 1, I have shown a fishing pole 1 which may be of the single piece type of construction or of the sectional type adapted to be built up by the joining together of a desired number of pole lengths.

This pole, which is provided with the usual line guides 2 secured thereto in the conventional manner, is at its lowermost end secured to and adapted to be actuated by the operating mechanism contained in a housing or casing of cylindrical form 3 as will be explained in detail hereinafter.

Rigidly secured to the housing or casing 3 externally thereof is another line guide 2 and a further pole portion 4 having a handle 5 secured at the end thereof. Attached in the usual fashion to pole portion 4 just above handle 5 is a line reel 6 having a rewind handle 7, all of conventional construction. Adapted to winding on reel 6 is the line 8, which in Fig. 1 is shown as threaded through the line guides 2 along the length of pole 1 and as extending from the upper end thereof towards the water 9. The free end of line 8 may, as usual, be provided with standard fishing paraphernalia such as a float 10, a weight or sinker 11, and a baited hook 12. As will be more fully hereinafter explained the construction and arrangement of the mechanism in the housing or casing 3 is such that the pole 1 may be rotated through a predetermined angle with respect to the pole portion 4 and handle 5 and set in such position ready to be rapidly and more or less forcefully returned to alignment with pole portion 4 and handle 5 upon tensioning of line 8 by the bite and/or pull of a fish 13 thereon. For purposes of illustration I have shown in Fig. 1 as above stated, the pole 1 in its set operative position by dot and dash lines and in its sprung or operated position by full lines.

Turning now to Figs. 2, 3 and 6 we find that the cylindrical housing or casing 3, which is relatively stationary, has an integral cylindrical boss 14 of slightly less height than the housing or casing 3, mounted in the center of the inner surface of the bottom 15 thereof. A circular cover plate 16 for said housing or casing 3 may be secured in place by any suitable means such as screws 17 which are adapted to be threaded in to screw holes 18 in boss 14. It of course will be understood at this point that other equally satisfactory means might be employed for this purpose such as a bayonet pin snap-joint or the like. Boss 14 is provided, as shown, with a plurality of diametrical vertical slots 19 any one of which is adapted to receive the bent end 20 of a coiled helical band spring 21 which is disposed within the housing or casing 3 and surrounds said boss. The free end 22 of spring 21 is bent into alignment with pole 1 and is secured in a slot in an extension 23 which depends from a collar 24 secured to the lower end of said pole. Secured to said extension 23 externally thereof is a catch 25 which is preferably, though not necessarily, of the general form and shape shown. As a matter of simplicity of construction a single screw 26, passing through catch 25, extension 23 and spring end 22, may be used to secure said catch to the extension and the spring end in the slot in said extension. The cylindrical wall of housing or casing 3 is provided with a slot 27 of predetermined length along and in which the extension 23 carrying catch 25 may be slid. Secured to housing or casing 3 by rivet 28 or other suitable means and at one end of slot 27 is a resilient bumper 29 of rubber or the like against which extension 23 may on recoil of spring 21, collide.

Adjacent the other end of slot 27 and secured to housing or casing 3 by a pivot pin 30, which runs transversely of said slot, there is mounted a catch 31 adapted to swivel on said pin. This catch as shown is provided with an external circular finger button 32 and an internal foot 33 against which a spring 34 is adapted to press. Secured in the cylindrical wall of housing or casing 3 is a pin 35 which is adapted to disposition within the coils of spring 34 to maintain the proper alignment thereof against foot 33.

Having thus described the construction of the embodiment shown in Figs. 2, 3 and 6 I will now describe the operation thereof as follows:

An appropriate spring 21 or other resilient member suited to the type and weight of fish to be caught is secured to the extension 23 in place within the housing or casing 3 under the desired and correct amount of tension, which is arranged for by selecting the appropriate slot 19 in boss 14 and inserting the bent end 20 of the band spring 21 therein. The free end 22 of spring 21 is secured in the slot in extension 23 as hereinbefore described. The housing or casing cover plate 16 is then secured in place and the line 8 is threaded through the line guides 2 and is provided at its free end with the usual paraphernalia such as a float, a sinker and a baited hook. The device and fully equipped pole is then ready for a cast to be made.

A cast is made and when sufficient line has run out the reel handle 7 is grasped to prevent further unreeling of the line. The pole handle 5 is then held in the right hand and the housing or casing 3 is held stationary in the palm of the left hand. A turning effort is applied to the pole or rod 1 and this is effected by the thumb of the left hand acting on the pole or rod 1. Under this turning effort the pole or rod 1 is rotated in slot 27 about the center of the housing or casing 3 towards catch 31; spring 21 being thereby tensioned and catch 25 being carried thereby along slot 27 towards catch 31. When catch 25 is near catch 31 sufficient pressure is applied by the forefinger of the left hand to finger button 32 to lower catch 31, against the action of spring 34 on foot 33, so that catch 31 will engage with catch 25 and hold the pole or rod 1 in rotated, set or operative position as shown in Figs. 1 and 3. After this has been done the reel handle 7 may again be adjusted, if desired, so that just a sufficient amount of line is out by taking up any slack created during the setting of the mechanism. Handle 7 is then firmly held against further rotation and the device and pole as a unit is then set and ready to operate. Such being the case the bite or pull of a fish will have the effect of tensioning line 8 and since it cannot further be unreeled a turning moment is thereby applied to the pole or rod 1 tending to rotate it further in its original clockwise direction of rotation, that is, towards the water. In so doing the catches 25 and 31 are slightly separated and disengaged. Immediately thereupon the spring 34 throws catch 31 completely up out of line and/or engagement with catch 25 and spring 21 immediately acts to return the pole or rod 1 by counterclockwise rotation, that is, away from the water, into alignment with the handle 5.

The sudden recoil of the pole or rod 1 under the action of the freed spring 21 creates a sudden pull and/or jerk on line 8 and firmly embeds the hook in the fish's mouth or jaw thereby insuring the landing of the fish. If the fishing is what might be termed "surface fishing" or "near-surface fishing", meaning thereby that the fisherman is seeking to catch fish which live, travel and/or feed near the surface of the water rather than those which are deep down and therefore necessitate the unreeling of a large length of line, then the sudden pull will not only act to firmly embed the hook but will also effectively jerk and pull the fish from the water.

Turning to Figs. 4 and 5 it will be observed that a possible modified embodiment of actuating mechanism is shown. In this embodiment the housing or casing 3 is also provided with a line guide 2 secured thereto and has its circular wall also provided with a slot 27. At one end of said slot is a bumper or buffer 36 of resilient material, which as shown may be of slightly different shape than bumper 29, that is, bumper 36 does not extend beyond the outer surface of the cylindrical wall of the housing or casing 3 as does bumper 29. Adjacent the other end of slot 27 and pivoted to swivel on transverse pin 30 is a catch 37 which is as shown of slightly different shape than catch 31 so that it may engage with the hook or catch 38 which is secured by screw 39 to a prolongation 40 of the pole 1. This prolongation depends from a collar 24' and is secured to a ring 41 which is rotatably mounted on a ball bearing 42 mounted in the center of the inner surface of the bottom 15 of the housing or casing 3. Secured to ring 41 in a position diametrically opposite to but in line with prolongation 40 is a further extension 43.

Mounted on the inner cylindrical wall of the housing or casing 3 are the hooks or catches 50 and 51 which are respectively detachably joined with the eyes 44 and 45 which in turn are secured on prolongation 40 and extension 43 by the respective detachable and therefore replaceable springs 46 and 47. Attached to the inner surface of the cylindrical wall of housing or casing 3 is a lug 49, preferably of resilient material such as rubber or the like which is adapted to act as an auxiliary bumper to take up the shock of the recoil of extension 43 as bumper 36 takes up the shock of the recoil of prolongation 40. Secured to the inner surface of wall 15 is a lug 48 adapted to act as a stop for foot 33 of catch 37. The foot 33 as in the embodiment of Figs. 2 and 3 is adapted to be operated by a spring 34 which is kept in alignment by a pin 35. In the embodiment of Figs. 4 and 5 the lug or stop 48 is necessary because no band spring 21 is present to limit the inward movement of the catch 37 under action of spring 34 on foot 33.

The setting of this embodiment is substantially the same as that of Figs. 2 and 3, namely the pole or rod 1 is rotated and engagement is effected between hooks or catches 37 and 38 with a resultant tensioning of springs 46 and 47. The actuation of this device is also substantially the same as that of Figs. 2 and 3, namely the fish's bite and/or pull effects disengagement between catches 37 and 38, spring 34 thereupon removes catch 37 completely out of the way and tensioned springs 46 and 47 act on the prolongation 40 and extension 43 to return the pole or rod 1 into alignment with the handle 5.

In the light of all the foregoing it is of course readily apparent that with respect to the actuating mechanism the relative positions of pole 1 and handle 5 in either or both embodiments could be interchanged, that is in both embodiments the pole could be made the stationary part and the handle the movable part instead of the pole being the movable part and the handle stationary as I have hereinabove described the devices. It is also apparent that the respective bumpers 29, 36 and 49 could be with good effect mounted on the moving pole prolongations or extensions instead of on the stationary casing and further, that other securing means might be employed to replace catches 25, 31, 37 and 38 with equal effect. It is also obvious that other mechanical expedients might be contrived to accomplish the desired ends herein expressed and further that the devices I have described might be employed with satisfactory results in connection with the trapping of animals other than fish.

Inasmuch therefore as many changes may be made in the above constructions and many apparently widely and different embodiments within the scope of the invention may be made without departing from the spirit and scope thereof and inasmuch as my invention may reasonably be used for many purposes, it is intended that all matter hereinabove contained or shown in the accompanying drawing shall be interpreted as illustrative and not in any way limiting. The following claims are intended to cover all generic and specific features of the invention described.

What I seek to secure by and claim for United States Letters Patent is:

1. In a combination of the type described a handle, a pole, resilient means for normally maintaining said handle and pole in alignment and means for setting said pole at an angle with respect to said handle against the returning action of said first mentioned resilient means.

2. In a combination of the type described a handle, a pole normally in alignment with said handle, means for setting said pole at an angle with respect to said handle and means for returning said pole into alignment with said handle.

3. In a combination of the type described a handle, a casing secured thereto, a pole extending into and resiliently carried by said casing, and means for setting said pole at an angle with respect to said handle.

4. In a fishing device a handle, a pole in alignment therewith, a casing joining said pole and handle, means for holding said pole and handle out of alignment and means within said casing for automatically and suddenly returning said pole and handle into alignment when said holding means is released in response to the bite and pull of a fish.

5. In a combination of the type described a handle, a casing secured thereto, a resilient member disposed within and secured to said casing, a fishing pole resiliently carried by the free end of said member in normal alignment with said handle, means for holding said fishing pole at an angle with respect to said handle against the action of said resilient member, said last mentioned means being adapted in response to the bite and pull of a fish to release said fishing pole for return into alignment with said handle under the action of said resilient member.

6. In a combination of the type described a handle, a casing secured thereto, a fishing pole in normal alignment with said handle extending into said casing and adapted to be rotated with respect to said handle, means for holding said fishing pole in rotated relation with respect to said handle, means for releasing said holding means and means for returning said fishing pole into alignment with said handle when said holding means is released.

7. In a combination of the type described a handle, a casing secured thereto, a fishing pole in normal alignment with said handle extending into and rotatably mounted within said casing, means for holding said fishing pole in rotated relation with respect to said handle, means for releasing said holding means and means for returning said fishing pole into alignment with said handle when said holding means is released.

8. In a fishing device a handle, a slotted casing mounted thereon, a fishing pole having an extension extending into said casing at one end of the slot therein, a catch pivotally mounted on said casing at the other end of the slot, a resilient member within and secured at one end thereof to said casing and at the other end thereof to the fish pole extension and a catch carried by said extension for engaging with the catch which is pivotally mounted on the casing for holding the pole out of alignment with the handle against the returning action of the resilient member.

9. The structure recited in claim 8 characterized in that the catch which is pivotally mounted on the casing is provided with a foot against which a resilient member is adapted to press for normally holding said catch away from and out of engagement with the catch carried on the extension of the fishing pole which extends into the casing.

10. The structure recited in claim 8 characterized in that buffer means in the nature of a resilient bumper is secured to the casing against which means the pole extension may impinge under the returning action of the resilient member.

11. In a fishing device a handle, a slotted cylindrical casing secured to said handle and having an internal integral slotted boss mounted therein, a pole having an extension extending into said casing at the slot therein, a resilient member disposed within said casing and secured to said boss at one of the slots therein and secured to said pole extension for resiliently supporting said pole with respect to said handle and means for holding said pole at an angle with respect to said handle.

12. In a fishing device a handle, a slotted cylindrical casing secured to said handle and having an internal integral slotted boss mounted therein, a pole having a collar at one end thereof, a slotted extension depending from said collar and into said casing at one end of the slot therein, a bumper secured to said casing at the same end of said slot, a helical band spring secured at one end thereof in a slot in said slotted boss and at the other end thereof in the slot in said extension, a catch secured to and carried by said extension, a second catch pivotally mounted on said casing adjacent the other end of the slot therein, said last mentioned catch having a foot internally of the casing and a finger button externally thereof and a spring adapted to press against the foot of said catch.

13. The structure recited in claim 12 characterized in that means is provided for maintaining the spring which presses against the catch foot in alignment therewith, said foot being limited in its movement under the action of said spring by contacting with the helical band spring.

14. The structure recited in claim 12 characterized in that a line reel is secured to the handle, a line guide is secured to the casing externally thereof and a plurality of spaced apart line guides are secured to the pole through which the fishing line from said reel is threaded before a baited hook is attached to the free end thereof.

15. In a fishing device of the type described a handle, a casing having a slot therein mounted on said handle, a bearing in said casing, a pole having a prolongation extending into said casing through the slot therein, said pole prolongation being adapted to slide along and in said slot, an eye on said prolongation, a bearing ring secured to said prolongation at the end thereof, a further pole extension secured to said bearing ring diametrically opposite to and in line with said prolongation, a second eye secured to said further pole extension, a pair of hooks secured to the inner wall of said casing, a resilent member detachably joining each hook with a corresponding eye and means for holding said pole in rotated relation with respect to said handle against the returning tendency of said resilient members which are in a tensioned condition when the pole is so held.

16. The structure recited in claim 15 characterized in that said holding means comprises a pivoted catch having a spring pressed foot limited in its movement by a stop-lug secured to said casing, said catch being adapted to engage with a cooperating catch secured to and carried by the pole prolongation.

17. The structure recited in claim 15 characterized in that bumpers are provided in said casing against which the pole prolongation and its further extension may collide when the holding means are released.

18. The structure recited in claim 15 characterized in that said holding means comprises a pivoted catch, a foot thereon, a spring adapted to press against said foot, means for holding said spring in alignment with said foot, a finger button secured to said catch and a cooperating catch on said prolongation.

19. In an automatic fishing device a handle, a pole, a line reel secured to said handle, a line wound thereon and adapted to be threaded along said pole and terminate in a baited hook, means for holding said pole at an angle with respect to said handle, means for releasing said holding means in response to the bite and pull of a fish and means for snapping said pole into alignment with said handle thereby firmly embedding the hook in the fish's mouth and jaw and pulling the fish from the water.

JULIUS C. CLAIRON.